April 30, 1940.　　　G. E. LINDEMANN　　　2,199,078
RECORDING INSTRUMENT PEN
Filed June 20, 1938

Inventor
George E. Lindemann
McConkey, Dawson & Booth
Attorneys

Patented Apr. 30, 1940

2,199,078

UNITED STATES PATENT OFFICE 2,199,078

RECORDING INSTRUMENT PEN

George E. Lindemann, Chicago, Ill., assignor to Republic Flow Meters Company, Chicago, Ill., a corporation of Illinois Application June 20, 1938, Serial No. 214,768

2 Claims. (Cl. 234—72)

This invention relates to recording instrument pens and more particularly to pens and pen mountings for recording instruments.

One of the objects of the invention is to provide an instrument pen which carries a self-contained supply of ink adequate for a considerable length of service.

Another object of the invention is to provide an instrument pen carrying a self-contained ink supply and which can readily be removed and replaced for refilling.

Another object is to provide a pen type instrument in which the pen can easily be removed and replaced from the front of the instrument.

Still another object is to provide pen mounting means for an instrument providing for easy removal and replacement of the pen.

Other objects, advantages and novel features of the invention will be apparent from the following description when read in connection with the accompanying drawing, in which.

Figure 1:
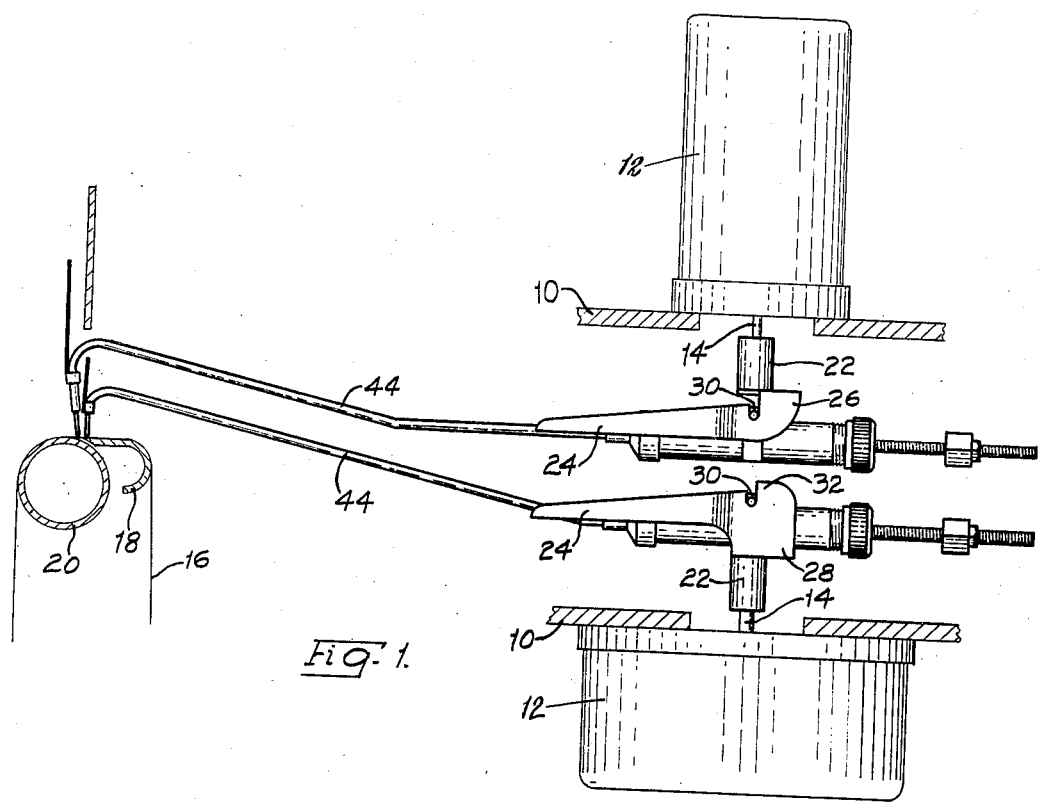
Figure 1 is a side view of a pen mounting in an instrument, certain of the instrument parts being illustrated schematically.

The instrument of Figure 1 comprises spaced horizontal frame members 10 each carrying an element 12 responsive to a condition to be measured. Each element includes a vertical shaft 14 projecting into the space between the frame members 10.

A chart 16 of the strip type is moved by suitable clock mechanism, not shown, over a fixed member 18 and a roller 20, these parts forming parts of a more or less conventional strip chart recorder. While a strip chart has been shown it will be understood that the invention is equally applicable to a disc type or any other suitable recorder.

Each of the shafts 14 carries a novel mounting bracket including a hub 22 secured to the shaft and carrying a pair of spaced substantially horizontal guide arms 24. In the bracket for the upper shaft 14 the arms lie below the hub and are connected thereto by extensions 26 at the rear side and in the lower bracket the arms lie above the hub and are connected thereto by extensions 28. Each of the arms 24 is formed in its upper surface with a notch 30 so arranged that a line through the notches in each pair of arms passes through an extension of the axis of the corresponding shaft 14. In the upper arms the notches are formed adjacent the extensions 26 and in the lower arms the rear sides 32 of the notches extend upward higher than the front side for a purpose to appear later. If desired plates 34 (Figure 2) may be secured outside the arms in register with the notches.

The pen according to the present invention comprises a cylindrical barrel 36 preferably formed of transparent or translucent plastic material and having a small vent opening 38 in its upper surface. The ends of the barrel are closed by a rear cap 40 and a front cap 42, the front cap preferably being permanently secured in place while the rear cap is removable as by means of screw threads and carrying a packing 41 to seal against the end of the barrel.

The front cap carries a pen tube 44 projecting therethrough into the barrel and terminating in a capillary inlet opening at the lower part of the barrel. The tube curves slightly upward and then down, terminating in a capillary marking point 46 adapted to rest on the chart 16 to make a record thereon. The rear cap carries an axial screw 48 on which a weighted nut 50 is threaded to provide an adjustable counterbalance for the pen to regulate its pressure against the chart. As shown in Figure 1 the upper and lower pens 44 are of different length so they may pass each other without interference.

In order to mount the pen in the bracket, the barrel 36 carries a transverse pin 52 of a length slightly greater than the distance between the notches 30. The pin is adapted to rest in the notches 30 pivotally to support the pen between the arms 24 so that the marking point engages the chart, the nut 50 being adjusted to balance the pen so that the marking point will engage the chart with a very light pressure.

To remove a pen for refilling or cleaning, an operator may grasp the front of the tube 44 and raise the pen to lift the pin 52 out of the notches 30. The pen may then be pulled forwardly through the front of the instrument. If the pen is to be refilled it may be held with the tube 44 down, the cap 40 may be removed and ink may be poured into the barrel, the ink flowing down by gravity to fill the tube 44.

Figure 2:
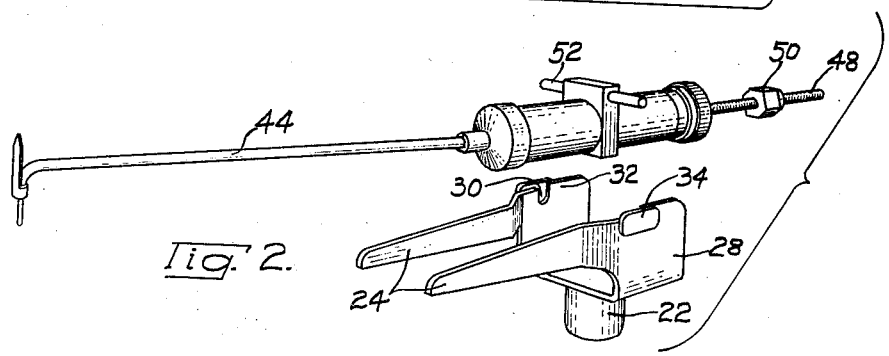
Figure 2 is a disassembled perspective of a pen and mounting bracket.
Figure 3:
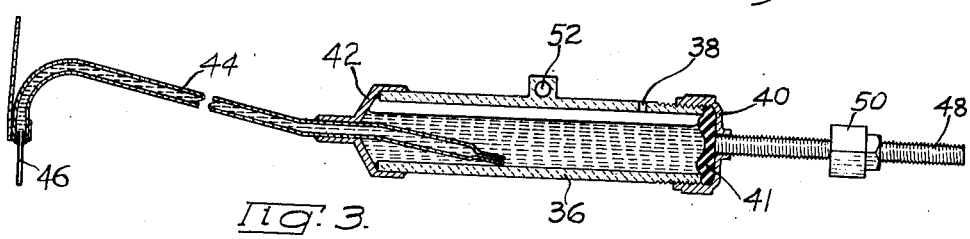
Figure 3 is a central section through the pen.

To replace the pen the operator holding the front of tube 44 may pass the barrel 36 back into the instrument between the arms 24 with the pin 52 resting on top of the arms. Preferably the arms 24 are shaped as indicated in Figure 2 to center the barrel between them. The pen may then be pushed back until the pen strikes either the extensions 26 or the raised portions 32 which will stop its rearward movement so that the ends of the pin will drop into the notches 30. The plates 34, when used, serve to prevent lengthwise movement of the pin.

While one pen and two mounting brackets have been shown and described it will be understood that various changes might be made and it is not intended to limit the scope of the invention to the exact structures illustrated nor otherwise than by the terms of the appended claims.

What is claimed is:

1. In combination with a pen having a transverse mounting pin, a mounting bracket mounted for pivotal movement about a vertical axis and comprising a pair of guide arms having vertical notches formed in their upper surfaces to receive the ends of the pin to form a free pivotal mounting for the pen about a horizontal axis and having long straight substantially horizontal pin guiding edges leading to said notches slidably to support the ends of the pin as it is slid along said edges into the notches.

2. In combination with a pen having a transverse mounting pin, a mounting bracket comprising a pair of guide arms having vertical notches formed in their upper surfaces to receive the ends of said pin, and long straight substantially horizontal pin guiding edges leading to said notches said arms being bent inwardly between their ends to engage the sides of the pen and center it between the arms.

GEORGE E. LINDEMANN.